US006941666B2

(12) United States Patent
Parish

(10) Patent No.: US 6,941,666 B2

(45) Date of Patent: Sep. 13, 2005

(54) FORKLIFT MAST POSITION INDICATOR

(76) Inventor: William J. Parish, P. O. Box 94, Brookside, NJ (US) 07926-0094

( * ) Notice: Subject to any disclaimer, the term of this patent is extended or adjusted under 35 U.S.C. 154(b) by 149 days.

(21) Appl. No.: 10/674,600

(22) Filed: Oct. 1, 2003

(65) Prior Publication Data

US 2005/0072010 A1 Apr. 7, 2005

(51) Int. Cl.[7] ........................... B23B 49/00; G01C 9/10

(52) U.S. Cl. ............................ 33/333; 33/335; 33/308; 33/365; 33/391; 33/398

(58) Field of Search .......................... 33/333, 335, 308, 33/365, 391, 397, 398, 348; 414/635

(56) References Cited

U.S. PATENT DOCUMENTS

| | | | | | |
|---|---|---|---|---|---|
| 3,800,425 | A | * | 4/1974 | Haynie | 33/333 |
| 3,865,265 | A | * | 2/1975 | Brudi et al. | 33/348 |
| 3,883,021 | A | * | 5/1975 | Wilhelm | 33/370 |
| 3,889,627 | A | * | 6/1975 | Cloyd | 33/402 |
| 3,975,831 | A | * | 8/1976 | Jysky et al. | 33/333 |
| 4,144,653 | A | * | 3/1979 | Gardner | 33/391 |
| 4,307,517 | A | * | 12/1981 | Casselberry | 33/391 |
| 4,356,638 | A | * | 11/1982 | McKenna et al. | 33/333 |
| 4,467,928 | A | * | 8/1984 | White | 212/298 |
| 4,495,706 | A | * | 1/1985 | Kaminski | 33/333 |
| 5,131,801 | A | * | 7/1992 | Melanson | 33/366.26 |
| 5,680,707 | A | * | 10/1997 | Boelling | 33/333 |
| 5,697,755 | A | | 12/1997 | McCauley | |
| 5,749,696 | A | | 5/1998 | Johnson | |
| 5,956,855 | A | * | 9/1999 | Foss et al. | 33/391 |

* cited by examiner

*Primary Examiner*—Christopher W. Fulton
*Assistant Examiner*—Yaritza Guadalupe
(74) *Attorney, Agent, or Firm*—Norman B. Rainer

(57) ABSTRACT

A device which is attachable to the mast of a forklift for indicating to the forklift operator the tilt angle of the mast in a vertical plane centered on the forklift includes a pivotably supported weighted pendulum, and an elongated activating arm secured to the upper extremity of the pendulum. The activating arm operates a component that is slideably mounted to a base plate, and carries an indicating pointer. A cover member fits over the base plate, and contains a window which accommodates the pointer. Indicia on the cover member interact with the pointer to show the tilt angle of the mast.

9 Claims, 3 Drawing Sheets

FORKLIFT MAST POSITION INDICATOR

BACKGROUND OF THE INVENTION

1. Field of the Invention

The present invention relates to industrial lift trucks such as forklift trucks, and more particularly concerns an improved device for indicating the tilt position of the mast which supports forwardly directed lifting forks.

2. Description of the Prior Art

Industrial forklift trucks are generally comprised of a wheeled chassis having a compartment which accommodates operating controls and a seated operator, and power means for moving the truck. Mounted to the forward end of the chassis is an upwardly directed mast which is pivotable with respect to the chassis. Tilting of the mast within a vertical plane is generally controlled by a tilt cylinder. A pair of forwardly directed forks are mounted for vertical sliding movement along the mast. As is known in the art, the forks may be inserted within a pallet which supports a load.

In most operations of a forklift, it is desirable that the forks be maintained in a horizontally level orientation. For example, a warehouse facility may typically provide for multiple pallets to be stacked on top of each other, wherein the pallet located on the uppermost level can be fifteen to twenty feet above the floor. Without maintaining the pallet at level or near level conditions, there is a danger of the pallet dropping with the possible injury to the workmen, the product, the pallet, or the forklift itself. Additionally, without maintaining the pallets in a level orientation, the pallets may not properly fit on top of the previous stack, resulting in the possibility of capsizing the stack.

In some operations, particularly when the forklift truck is riding upon an inclined surface, it may be necessary to adjust the angular position of the mast so as to bring the forks into a more horizontal disposition. In operations where the forks are at a very high elevation, it may be necessary to adjust the angle of the mast so as to maintain the center of gravity of the loaded truck within safe limits. Excessive incline of the mast can also cause damage to the outermost planks of a pallet.

In view of these concerns, various level indicating devices have been developed for forklifts, including those set forth in U.S. Pat. No. 3,312,361 to Foster; U.S. Pat. No. 3,865,265 to Brudi et. al. and U.S. Pat. No. 3,883,021 to Wilhelm. These devices essentially work on a plumb bob principle which indicates the degree of tilt of the mast assembly. The difficulty with such devices is that malfunctions of the plumb bob, caused by foreign matter or physical damage, are not easily detected. Lateral movement of the mast transversely to the vertical plane can also produce inaccurate results.

U.S. Pat. No. 5,697,755 to McCauley et. al. discloses a mechanical forklift level indicator which includes a first arm pivotably connected to the body of the forklift, and a second arm pivotably connected to the forklift mast assembly. Interaction of the arms with the mast indicate the relative orientation of the forks.

U.S. Pat. No. 5,749,696 to Johnson discloses a tilt sensor for the mast of a forklift truck. The sensor is incorporated into a tilt cylinder interactive between the mast and the, truck body. The sensor employs a magnet adapted to slide along a series of transistors, thereby producing electronic signals. The signals are routed to a computer controller which interacts electronically with a display unit providing illuminated position information to the operator.

The aforesaid earlier mast tilt indicator devices are generally of complex construction susceptible to breakage or malfunction under severe operating conditions, or in harsh environments. Also, the indicator mechanism is often not easily readable by the operator, thereby detracting from his full attention to the operation of the forklift truck. Some of the aforesaid devices may be suitably installed at the factory where the forklift truck is manufactured, but cannot readily be added onto an already manufactured forklift truck.

It is accordingly an object of the present invention to overcome the aforementioned drawbacks of the prior art by providing a simple, reliable device easily installable onto the mast of a forklift truck for indicating the angular position of the mast within a vertical plane.

A further object of this invention is to provide a mast position indicating device which can be easily viewed from the forklift operator's position.

It is still another object of the present invention to provide a durable mast position indicating device amenable to low cost manufacture.

These objects and other objects and advantages of the invention will be apparent from the following description.

SUMMARY OF THE INVENTION

The above and other beneficial objects and advantages are accomplished in accordance with the present invention by an incline indicator for the mast of a forklift comprising:

a) a base member comprising a flat panel bounded in part by interior and exterior surfaces and forward and rearward edge extremities, said forward edge extremity having an abutment projection orthogonally disposed to said panel and directed outwardly from said exterior surface, b) an elongated weighted pendulum pendently supported at its upper extremity by pivot means secured to said interior surface and which permits swinging movement of said pendulum in a vertical plane parallel to said interior surface, c) an elongated activating arm secured to the upper extremity of said pendulum in orthogonal relationship to the direction of elongation of said pendulum and extending to a distal extremity located adjacent the forward edge extremity of said panel, d) a sliding member moveable by said activating arm, and having a forward portion, e) straight track means associated with said interior surface adjacent said forward edge extremity and engaging said sliding member, whereby said sliding member is constrained to reciprocating linear movement in a path parallel to said forward edge extremity, f) pointer means associated with the forward portion of said sliding member, and g) a cover member configured to fit onto said base member in facing relationship to said interior surface in a manner to protectively embrace said pendulum, activating arm and sliding member, and having a forward lip containing an elongated window which permits observation of said pointer means, and markings interactive with said pointer means to indicate the degree and direction of incline of said mast within a vertical plane.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
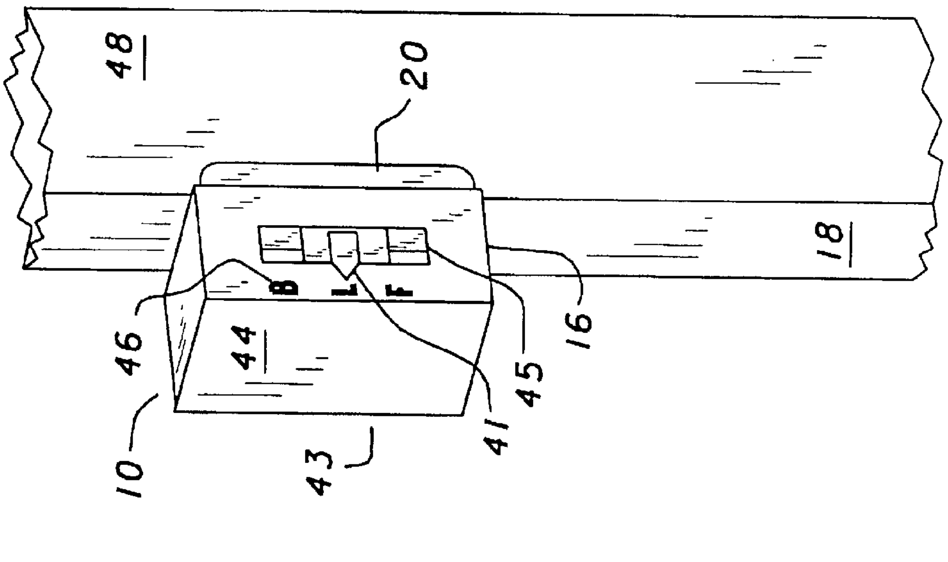
FIG. 1 is a perspective front and side view of an embodiment of the incline indicator of the present invention shown in operative association with the mast of a forklift.
Figure 2:
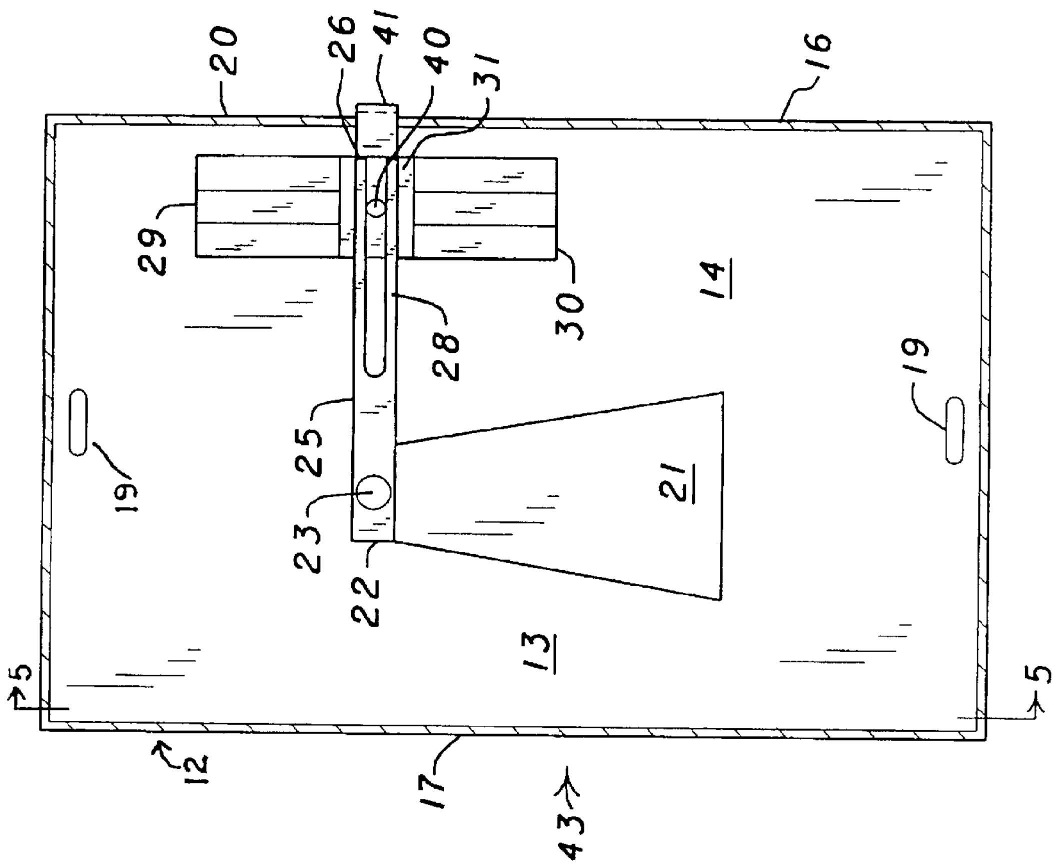
FIG. 2 is a vertical sectional view of the embodiment of FIG. 1 showing the incline indicator in a state indicating that the mast is vertical.

Referring now to FIGS. 1–7, an embodiment of the incline indicator 10 of the present invention is shown in operative association with the mast 11 of a forklift truck.

Incline indicator 10 is comprised of a base member 12 shown consisting of a flat panel 13 bounded in part by interior and exterior surfaces 14 and 15, respectively, and forward and rearward edge extremities 16 and 17, respectively. Said exterior surface is adapted to fit flush against the side 18 of mast 11, and attach thereto by way of adhesives, magnets or screws which penetrate mounting apertures 19. An abutment projection in the form of elongated strip 20 directed outwardly from surface 15 in orthogonal relationship thereto is disposed at forward edge extremity 16. Said strip 20 is preferably a continuous integral extension of panel 13, formed by way of a bending operation. Strip 20 is adapted to abut against the edge surface 48 of said mast, said edge surface being directed toward the lift truck operator.

An elongated weighted pendulum 21 is pendently supported at its upper extremity 22 by pivot post 23 vertically emergent from interior surface 14. Such manner of mounting permits swinging movement of the pendulum in a vertical plane 50 parallel to said interior surface and parallel to the path of pivoted movement of the mast. The pendulum is preferably fabricated of a dense material such as iron or lead.

An elongated activating arm 25 is affixed to upper extremity 22 of said pendulum in orthogonal relationship to the direction of elongation of said pendulum. Activating arm 25 extends to a distal extremity 26 located adjacent forward edge extremity 16. A portion of activating arm 25 contiguous to said distal extremity is bifurcated, thereby forming retaining means 28. Said retaining means may alternatively be an elongated slot bounded by parallel straight bearing surfaces.

Straight track means in the form of rod means 29 secured to plate 30 is affixed to interior surface 14 adjacent forward edge extremity 16. Sliding member 31 of substantially block configuration has a guide channel 51 which accommodates rod 29 in a manner to enable said sliding member to slide freely in engagement with rod 29 in a linear path parallel to said forward edge extremity. A cylindrical bearing stub 40 is interiorly directed from a face of said sliding member, and is embraced by retaining means 28. A pointer 41 is attached to a forward portion of sliding member 31, and extends forwardly of abutment strip 20. Rod means 29 may alternatively be a rounded, substantially cylindrical protrusion formed as a continuous integral extension of plate 30.

A cover member 43 is configured to fit onto said base member in spaced apart facing relationship with interior surface 14 in a manner to protectively enclose said pendulum, activating arm and sliding member. Cover member 43 has a forward lip 44 having an elongated window aperture 45 within which pointer 41 intrudes and undergoes reciprocating movement responsive to the movement of sliding member 31. Cover member 43 may attach to base member 12 by way of conventional fasteners or by way of a snap-on configuration.

Markings 46 on forward lip 44 are interactive with pointer 41 to indicate the degree and direction of incline of said mast relative to a vertical position. In the illustrated embodiment, said markings are shown as "B", "L" and "F" in descending vertical sequence. The "B" indicates that the mast is tilted backwardly. The "L" indicates that the forks are level, which means that the mast is vertical. The "F" indicates that the mast is forwardly tilted. Markings 46 may further include a ruled scale of markings.

Figure 3:
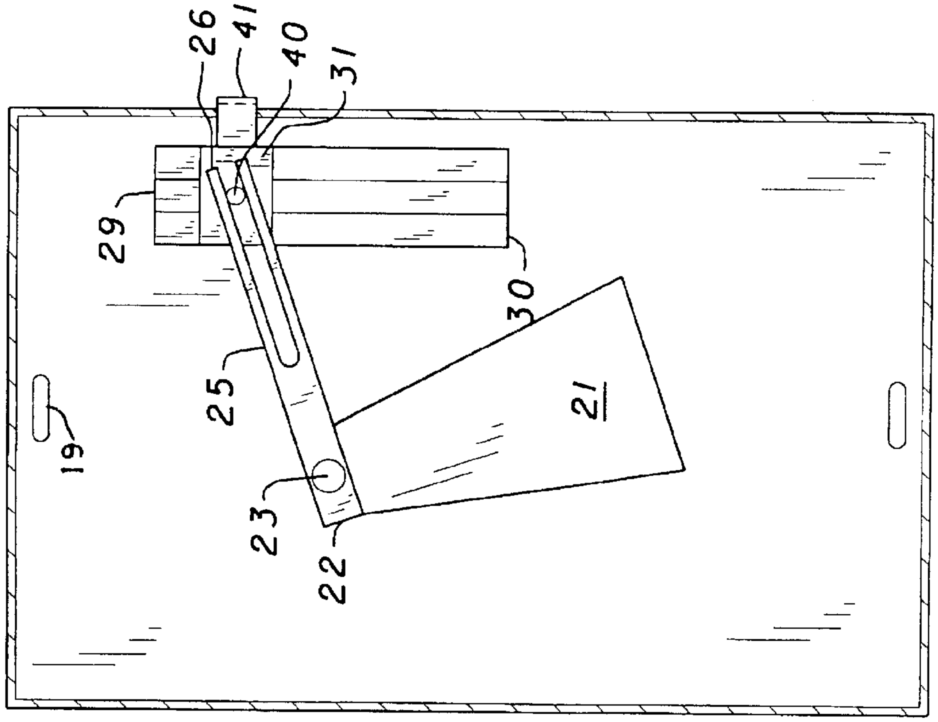
FIG. 3 is a view similar to FIG. 2 showing the incline indicator in a state indicating that the mast is angled toward the rear of the forklift.
Figure 7:
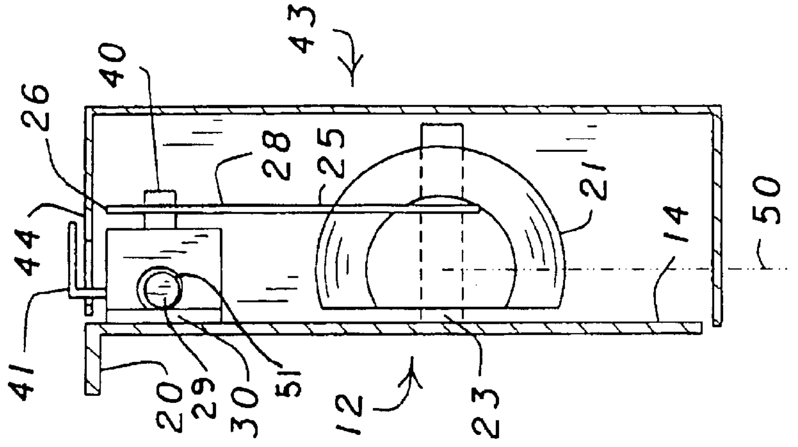
FIG. 7 is a top view with portions broken away.
Figure 6:
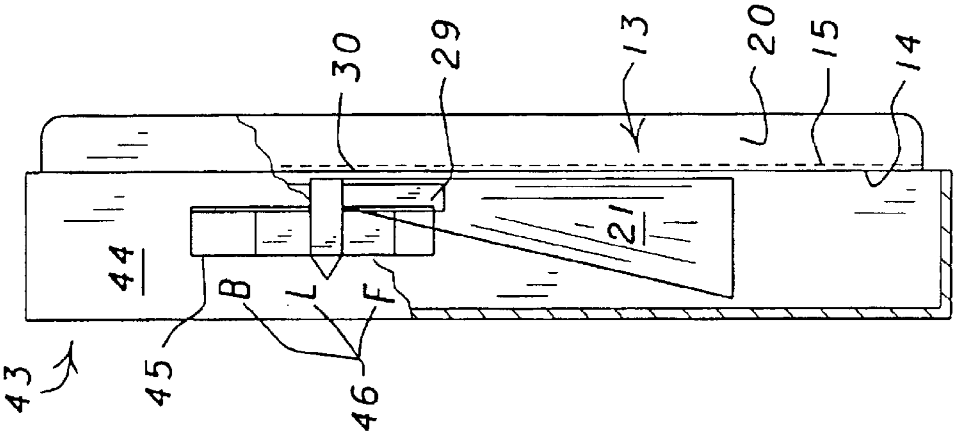
FIG. 6 is a front view of the embodiment of FIG. 1 with portions broken away to reveal interior details.
Figure 5:
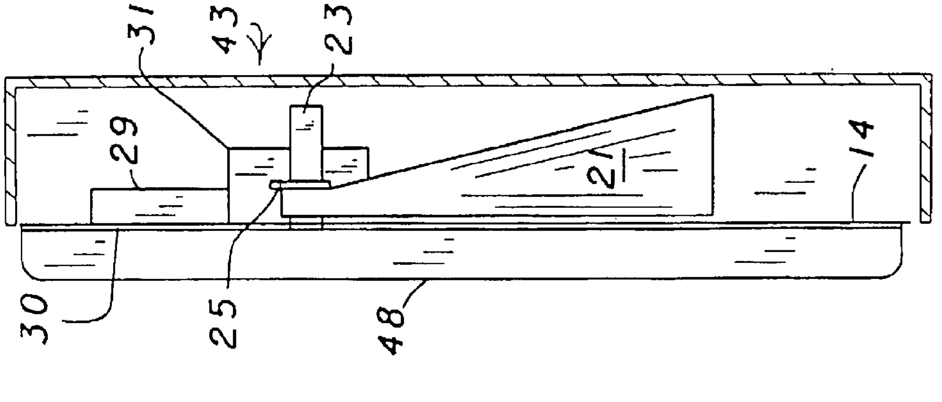
FIG. 5 is a sectional rear view taken in the direction of arrows upon the line 5—5 of FIG. 2.

In operation, when the mast is tilted rearwardly of the forklift, the distal extremity 26 of activating arm 25 will be caused to rise with respect to rod 29, as shown in FIG. 3. Such action drives sliding member upwardly, carrying with it pointer 41 to the "B" position on markings 46.

When the mast is in a vertical position, causing the forks to be horizontally level, the pendulum causes activating arm 25 to be horizontally disposed, as shown in FIG. 1, whereby pointer 41 resides at the "L" position on the scale of markings.

Figure 4:
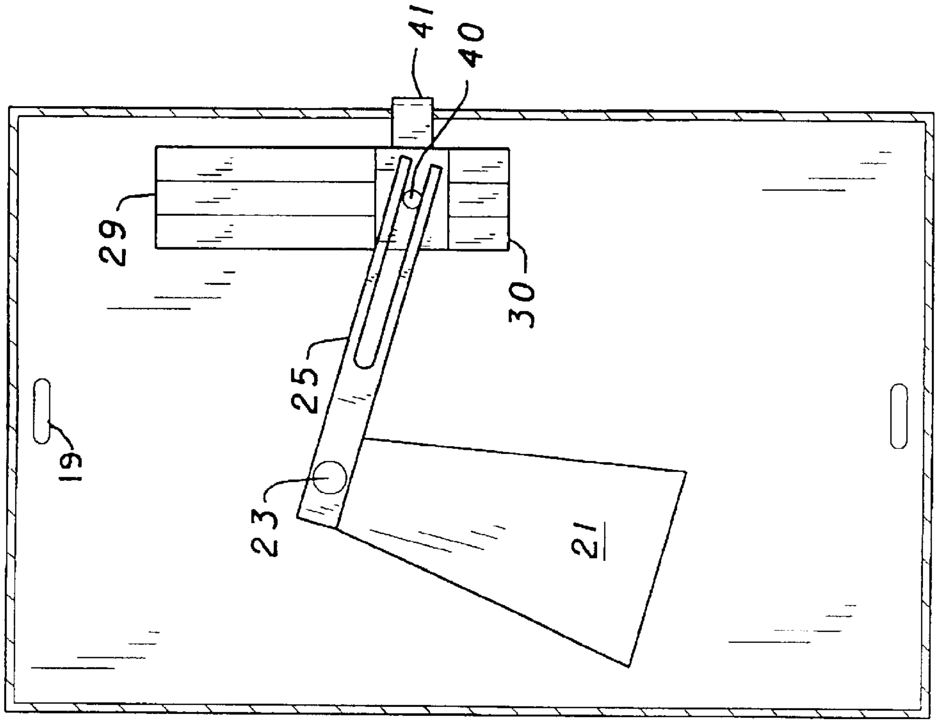
FIG. 4 is a view similar to FIG. 2 showing the incline indicator in a state indicating that the mast is angled forwardly of the forklift.

When the mast is tilted forwardly, pendulum 21 drives the distal extremity 26 of activating arm 25 downwardly upon rod 29, as shown in FIG. 4, thereby moving pointer 41 to the "F" position on markings 46. By virtue of the easily observable position of the pointer upon the scale of markings, the operator of the forklift is informed at a glance of the exact position of the mast. The operation of the device is unaffected by lateral departure of the mast from a vertical plane, a condition that may be produced by uneven terrain or uneven tire height.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An incline indicator for the mast of a forklift comprising:

a) a base member comprising a flat panel bounded in part by interior and exterior surfaces and forward and rearward edge extremities, said forward edge extremity having an abutment projection orthogonally disposed to said panel and directed outwardly from said exterior surface, b) an elongated weighted pendulum pendently supported at its upper extremity by pivot means secured to said interior surface and which permits swinging movement of said pendulum in a vertical plane parallel to said interior surface, c) an elongated activating arm secured to the upper extremity of said pendulum in orthogonal relationship to the direction of elongation of said pendulum and extending to a distal extremity located adjacent the forward edge extremity of said panel, d) a sliding member moveable by said activating arm, and having a forward portion, e) straight track means associated with said interior surface adjacent said forward edge extremity and engaging said sliding member, whereby said sliding member is constrained to reciprocating linear movement in a path parallel to said forward edge extremity, f) pointer means associated with the forward portion of said sliding member, and g) a cover member configured to fit onto said base member in facing relationship to said interior surface in a manner to protectively embrace said pendulum, activating arm and sliding member, and having a forward lip containing an elongated window which permits observation of said pointer means, and markings interactive with said pointer means to indicate the degree and direction of incline of said mast within a vertical plane.

2. The incline indicator of claim 1 wherein the flat panel of said base member is adapted to be attached to said mast.

3. The incline indicator of claim 2 wherein said abutment projection is a panel formed as a continuous integral extension of said flat panel and adapted to abut against mast.

4. The incline indicator of claim 3 whereby elongated retaining means are associated with said activating arm adjacent said distal extremity thereof.

5. The incline indicator of claim 4 wherein said retaining means is a slot bounded by parallel straight bearing surfaces.

6. The incline indicator of claim 4 wherein said sliding member has a cylindrical bearing stub which is slideably embraced by said elongated retaining means.

7. The incline indicator of claim 1 wherein said track means comprises rod means of rounded, substantially cylindrical configuration.

8. The incline indicator of claim 7 wherein said sliding member includes a guide channel which slideably accommodates said rod means.

9. An incline indicator for the mast of a forklift comprising:

a) a base member comprising a flat panel adapted to be attached to said mast, and bounded in part by interior and exterior surfaces and forward and rearward edge extremities, said forward edge extremity having an abutment projection orthogonally disposed to said panel and directed outwardly from said exterior surface, said abutment projection being a panel formed as a continuous integral extension of said flat panel and adapted to abut against said mast, b) an elongated weighted pendulum pendently supported at its upper extremity by pivot means secured to said interior surface and which permits swinging movement of said pendulum in a vertical plane parallel to said interior surface, c) an elongated activating arm secured to the upper extremity of said pendulum in orthogonal relationship to the direction of elongation of said pendulum and extending to a distal extremity located adjacent the forward edge extremity of said panel, said distal extremity having elongated retaining means in the form of a bifurcated portion of said activating arm, d) a sliding member moveable by said activating arm, and having a forward portion, e) straight track means associated with said interior surface adjacent said forward edge extremity and engaging said sliding member, whereby said sliding member is constrained to reciprocating linear movement in a path parallel to said forward edge extremity, f) pointer means associated with a forward portion of said sliding member and g) a cover member configured to fit onto said base member in facing relationship to said interior surface in a manner to protectively embrace said pendulum, activating arm and sliding member, and having a forward lip containing an elongated window which permits observation of said pointer member, and markings interactive with said pointer means to indicate the degree and direction of incline of said mast within a vertical plane.

* * * * *